United States Patent [19]

Rhodes et al.

[11] 4,290,671
[45] Sep. 22, 1981

[54] COLOR ENCODING FILTER

[75] Inventors: Roland N. Rhodes, Belle Mead, N.J.; Alfred C. Schroeder, Southampton, Pa.; Warren H. Moles, Flemington, N.J.

[73] Assignee: RCA Corporation, New York, N.Y.

[21] Appl. No.: 122,722

[22] Filed: Feb. 19, 1980

[51] Int. Cl.³ .......................... G02B 5/20; H04N 9/07
[52] U.S. Cl. ...................................... 350/317; 358/44
[58] Field of Search .................. 350/317; 358/44, 55

[56] References Cited
U.S. PATENT DOCUMENTS
4,004,176  1/1977  Otake et al. ...................... 358/44

Primary Examiner—John K. Corbin
Assistant Examiner—Bruce Y. Arnold
Attorney, Agent, or Firm—Paul J. Rasmussen; William H. Meise; Henry I. Steckler

[57] ABSTRACT

A filter for use with a CCD imager has vertical color stripes that have a non-integral relationship to the CCD sensors. A means for controlling the amount of a particular color that falls on a particular photosensor suppresses undesired signals.

8 Claims, 6 Drawing Figures

COLOR ENCODING FILTER

BACKGROUND OF THE INVENTION

The present invention relates to color encoding filters, and more particularly, to such filters when used with a charge-coupled device (CCD) image sensor.

As described in U.S. Patent Application Ser. No. 118,301, filed Feb. 4, 1980, in the name of R. Rhodes, the use of vertical stripe encoding filters with a non-integral relationship to the CCD photosensors causes a moire pattern, resulting from the beat between the vertical stripes and the vertical columns of the CCD image sensors. When the image sensors are scanned to provide the camera output, a signal is generated which has frequency components that are related to both the fundamental of the beat frequency and to harmonics thereof when viewing a colored area. These frequencies in the signal contain the chroma information, but if applied to a display device would cause an undesirable vertical stripe pattern when viewing color areas.

It is therefore desirable to reduce the visible vertical stripes.

SUMMARY OF THE INVENTION

A filter for use with an image pick-up device, the device having a plurality of columns of photosensors, said filter comprising a plurality of vertical color filter stripes arranged in horizontally repeating cycles of color order and having a non-integral relationship with respect to said columns, and means for controlling the amount of a particular color impinging upon a particular photosensor such that the fundamental and no undesired harmonics of the beat between the columns and the stripes are generated in resulting color signals from said photosensors.

DETAILED DESCRIPTION

Figure 1:
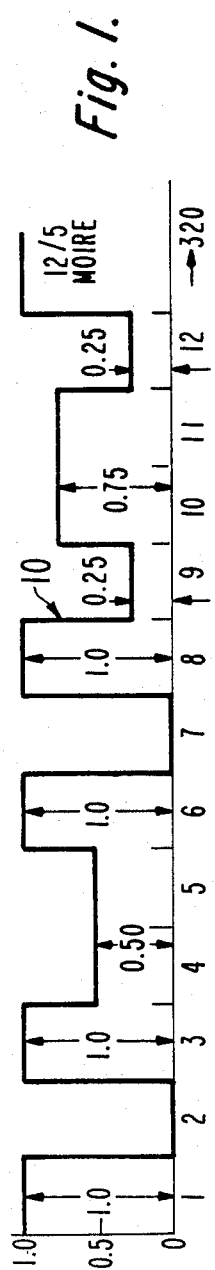
FIG. 1 shows a typical color encoding camera output waveform when viewing a red color field using the prior art filter.

In said prior application there is disclosed a single imager pick-up device camera using a CCD image sensor that has 320 photosensors per horizontal line. For the horizontal space occupied by every 12 of these photosensors, there are 5 triads, each triad comprising red, blue and green vertical stripe color filters. An output waveform is obtained, which is derived from a "C" register, which is conventionally part of a CCD imager. The amplitude of output waveform 10 when viewing a red field is shown in FIG. 1 plotted against horizontal position as measured by photosensor number for the first 12 photosensors. Since the "C" register is sequentially shifted to provide the output signal, the horizontal axis also represents time. The amplitude of waveform 10 is a function of the amount that a red stripe is disposed over a particular photosensor. Blue and green waveforms, i.e. output waveforms when viewing blue and green fields respectively, are similar but have their envelopes shifted 120 and 240 degrees respectively with respect to the red field output waveform shown on FIG. 1. When the waveform 10 of FIG. 1 is Fourier analyzed, the relative amplitudes of its frequency components are as follows:

TABLE 1

| Freq. (mHz) | .5 | 1.0 | 1.5 | 2.0 | 2.5 | 3.0 | 3.5 | 4.0 | 4.5 | 5.0 |
|---|---|---|---|---|---|---|---|---|---|---|
| Amp. (peak-to-peak) | .011 | .079 | 0 | .039 | .439 | 0 | .313 | .020 | 0 | .016 |

The 3.0 mHz component is a suppressed carrier wave, which is due to the geometry of the filter as compared with that of the CCD imager, as is more fully explained in said prior application. The 2.5 and 3.5 mHz components are the most desired subcarrier frequencies that convey the color information since they are the strongest, while the remaining components are not needed and will only cause a low frequency vertical pattern that is visible on a raster when viewing colors. It is desired to eliminate the vertical pattern by eliminating said remaining components by use of the present invention.

Figure 2:
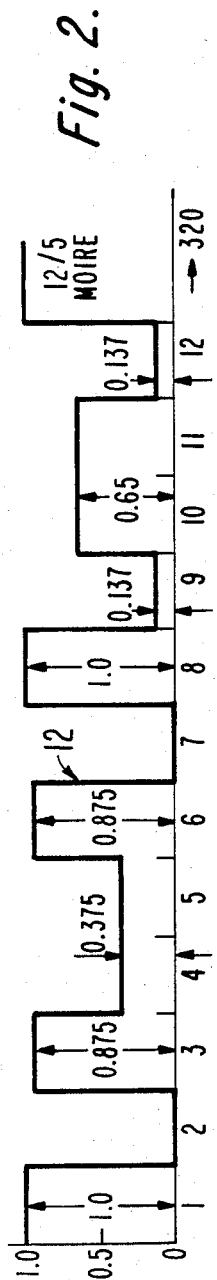
FIG. 2 shows a desired waveform.

FIG. 2 shows a waveform that is similar to the waveform of FIG. 1, but if a Fourier analysis is carried out, it can be shown that it contains only the 2½ and 3½ mHz subcarriers and essentially none of said remaining components that cause a vertical pattern to arise when the waveform of FIG. 1 is viewed by a display device. Therefore, the present invention comprises several embodiments for achieving this waveform.

Figure 3:
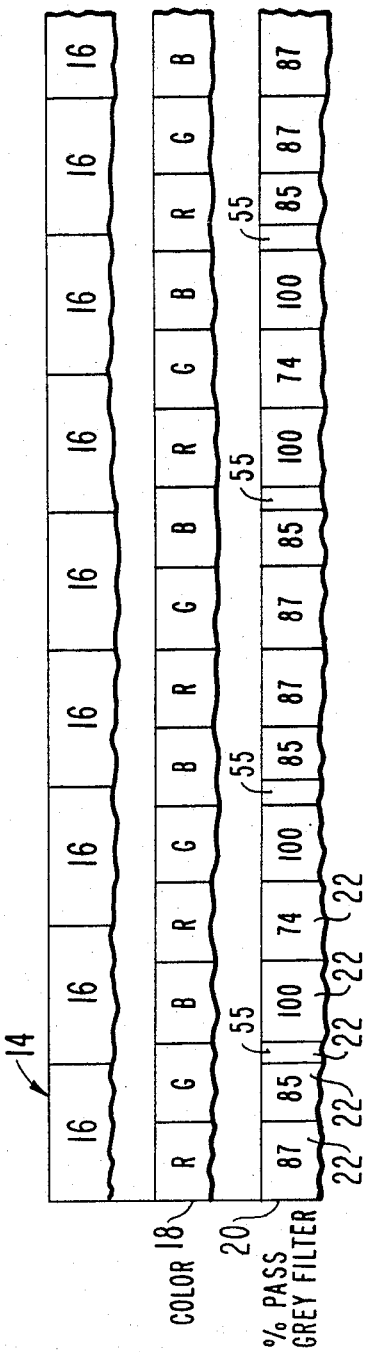
FIG. 3 shows one method of achieving this using a grey striped filter.

FIG. 3 shows a first embodiment for achieving the waveform 12 comprising a portion of a CCD image pick-up device 14 showing one beat cycle and having a horizontal array of photosensors 16. A color filter 18 having repeating triads of red (R), green (G), and blue (B) color filters is disposed in front of the device 14 with the lefthand edges of device 14 and filter 18 in alignment. In front of the color filter 18 is disposed a grey neutral density striped filter 20. Filter 20 has sections 22 whose transmittances vary in accordance with that determined by waveform 12 of FIG. 2. The transmittance pattern repeats every four photosensors. In order to determine the required transmittances of the individual grey stripes in order to achieve the waveform 12 of FIG. 2 the following procedure was used. Starting with the red field, the spatial phase, i.e. the horizontal position, and the amplitude, of the 500 kHz fundamental component of waveform 12 was noted. Grey material having horizontally varying transmittance was placed in front of the red filter elements, i.e. lesser transmittance was placed where the peaks of this component of the waveform occur and greater transmittance was placed where the troughs of the same waveform component occur. Intermediate amounts were placed therebetween. The result is that the light transmission through the combination of red stripes and the grey filter stripes produces a signal which is equal and opposite to that produced by the fundamental component of the moire effect due to said beat. The same procedure is followed for all of the significant harmonics of the moire except for the desired fifth and seventh ones which generate the 2.5 and 3.5 mHz subcarriers. The same procedure is done for the blue and green colors. Therefore, the red, blue, and green output signals from the "C" register will be a close approximation to the ideal waveform 12 of FIG. 2.

Figure 4:
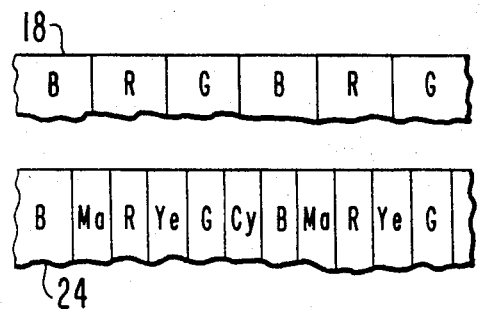
FIG. 4 shows a second way of achieving this using a color vertical stripe filter.

A second means for achieving a signal having low harmonic content is shown in FIG. 4. Here the simple triad color filter 18 is shown for reference and the second embodiment of the invention is designated by the numeral 24. It comprises red, green and blue vertical stripes with the areas between the stripes being blends of adjacent stripes. Thus, between the red and green vertical stripes there are yellow (Ye) stripes, formed by the overlap of red and green stripes, between the green and blue vertical stripes there are cyan (Cy) stripes, formed by the overlap of green and blue stripes, and between the blue and red vertical stripes there are magenta (Mg) stripes, formed by the overlap of blue and red stripes. Alternatively, a filter could be made of magenta, yellow, and cyan stripes which are partially overlapped to produce red, green and blue vertical stripes disposed between the magenta and yellow stripes, the yellow and cyan stripes, and the cyan and magenta stripes respectively. It ca be shown that the waveform of the output signal from the embodiment of FIG. 4 is a better approximation to that of the ideal waveform of FIG. 2 than is the waveform of FIG. 1 derived from the prior art filter. This can be shown by Fourier analysis.

Figure 5:
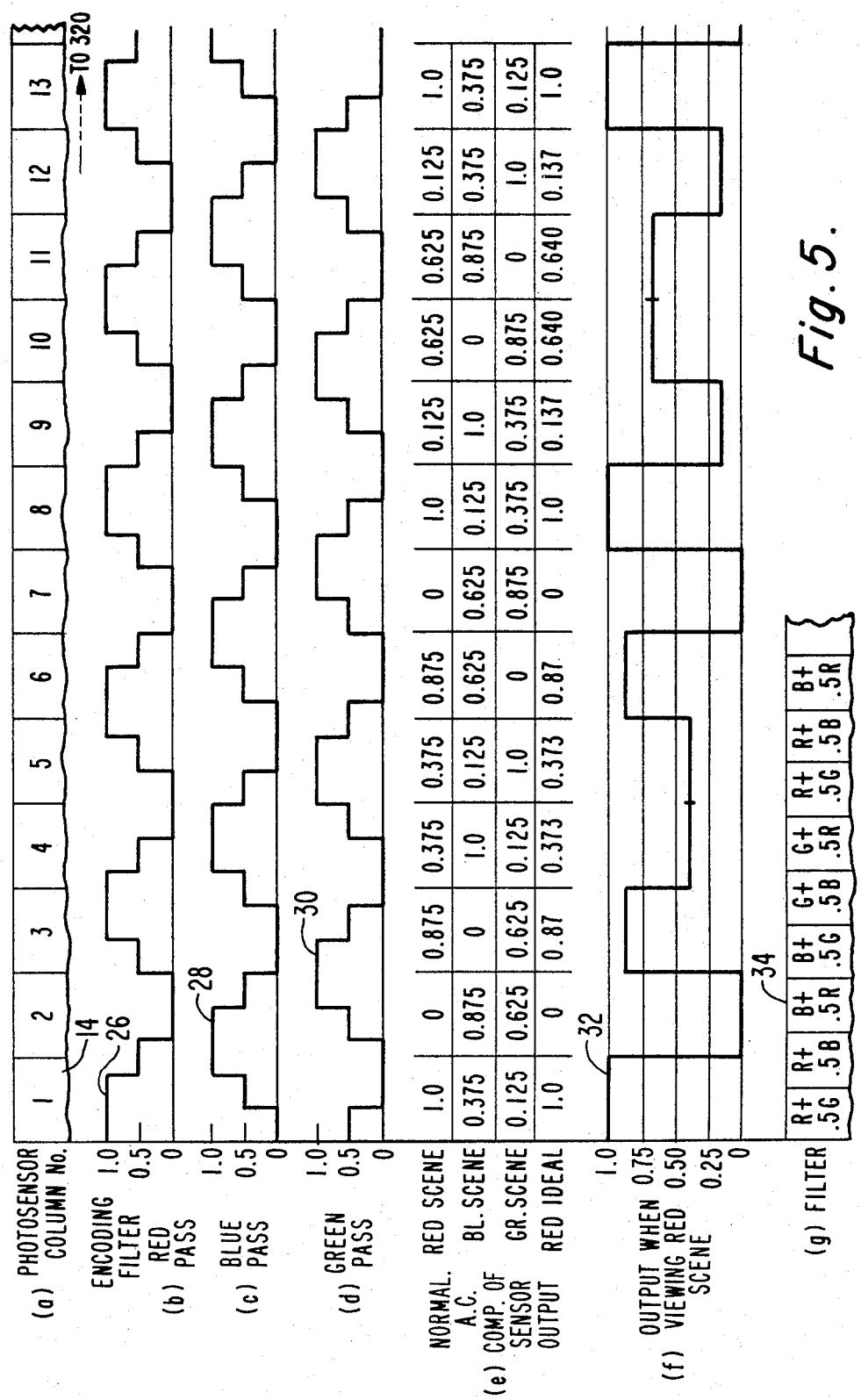
FIG. 5 shows an alternate embodiment of a filter in accordance with the invention.

The filter of FIG. 3 may be difficult to make because of the narrow width of vertical stripes thereon as well as the many varying transmittances. FIG. 5 shows an alternative embodiment to achieve this, where FIG. 5A shows the photosensors of the upper left side of a CCD imager 14. FIGS. 5B, C and D show the transmittance functions 26, 28, and 30 for red, blue and green filters respectively. It will be noted that they have only 0, 0.5 and 1 level transmittances. FIG. 5E tabulates for each of the photosensors shown in FIG. 5A the normalized (1 being the maximum) A.C. component of a photosensor output when viewing various pure color scenes. This A.C. component is developed when the photosensor columns are read out from the "C" register. FIG. 5F shows a plot of the output signal when viewing the red scene. It will be seen that this plot is the same as that of the beat free plot of FIG. 2. FIG. 5G shows a vertical stripe filter 34 comprising 12 micron wide stripes that can be used to generate the waveforms of FIG. 5F when used with a CCD imager having 30 micron wide columns. The proportion of each color in each vertical stripe corresponds to that given in FIGS. 5B, C, and D. However, in this filter it may be difficult to get the numerically exact color proportions correct, and it may be difficult to match primary colors that appear over different photosensors since different filter materials combine multiplicatively rather than simply additively.

Figure 6:
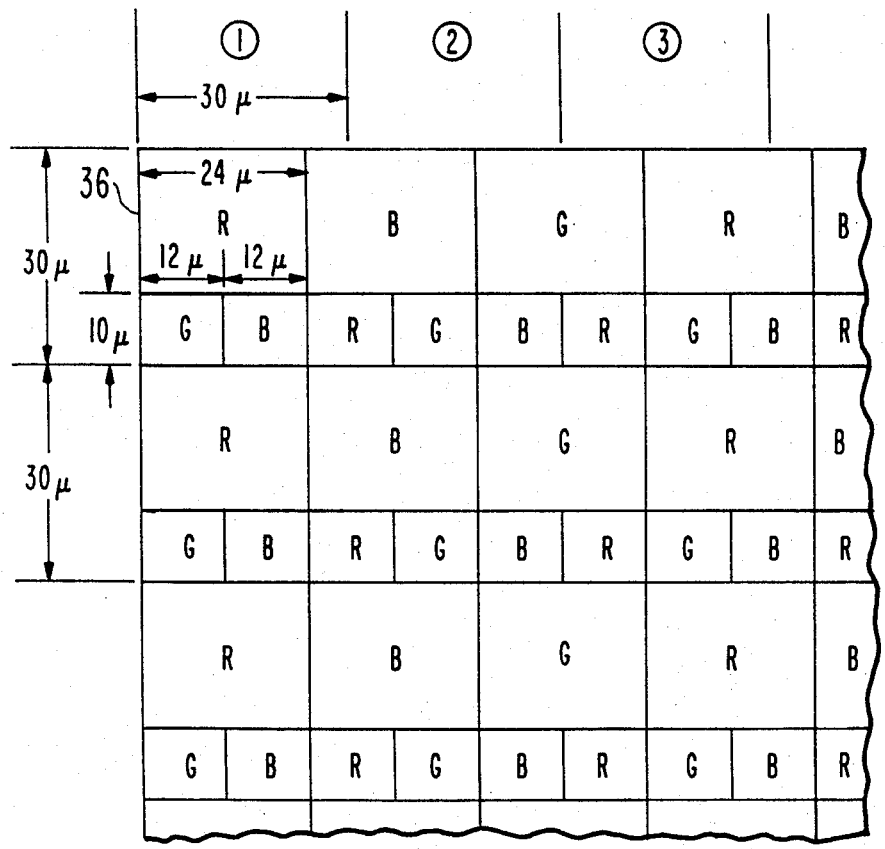
FIG. 6 shows another embodiment.

FIG. 6 shows a filter 36 that is easier to construct than the filter of FIG. 5G but achieves the same results. The larger color filter sections are 24 microns wide and 20 microns high. The smaller color filter sections are 12 microns wide and 10 microns high. The sum of the heights of the large and small color filter sections is 30 microns, which is equal to the photosensor height. If one considers dividing the 24 microns wide sections into 12 micron wide vertically extending stripes, it can be seen that the color composition of these stripes is identical to the vertical stripes of filter 34 in FIG. 5G. Therefore, the filter 36 produces the same desirable waveforms as filter 34. Note that if there is vertical misalignment of filter 36 with respect to the CCD imager, or if vertical interlace is used, the color composition over a particular photosensor remains the same.

It will be appreciated that many other embodiments are possible, for example the lens which relays the red, blue and green color stripes of the filter of said prior application onto the CCD can be defocused. The output signals in this case can be made to approximate the waveform of FIG. 2. This provides a reduction in the magnitude of the visibility of the undesired stripes.

What is claimed is:

1. A filter for use with an image pick-up device having a plurality of columns of photosensors, said filter comprising: a plurality of vertical color filter stripes arranged in horizontally repeating cycles of color order and having a non-integral relationship with respect to said columns of photosensors; and means for controlling the amount of a particular color impinging upon a particular photosensor such that the fundamental and reduced undesired harmonics of the beat frequency between said columns and said stripes are generated in the resulting color signals from said photosensors.

2. A filter as claimed in claim 1, wherein said means for controlling comprises a grey neutral density filter having vertical stripes of horizontally varying transmittances, said grey filter being disposed in front of said photosensors and selectively aligned with said filter stripes.

3. A filter as claimed in claim 1, wherein said means for controlling comprises a partial overlapping of said stripes of said color filter.

4. A filter as claimed in claim 3, wherein said filter comprises red, green, and blue stripes, and wherein the overlapped areas of said red stripes and said green stripes are yellow, the overlapped areas of said green stripes and said blue stripes are cyan, and the overlapped areas of said blue stripes and said red stripes are magenta.

5. A filter as claimed in claim 3, wherein said filter comprises magenta, yellow, and cyan stripes, and wherein the overlapped areas of said magenta stripes and said yellow stripes are red, the overlapped areas of said yellow stripes and said cyan stripes are green, and the overlapped areas of said cyan stripes and said magenta stripes are blue.

6. A filter as claimed in claim 1, wherein said means for controlling comprises said stripes being slightly defocussed on said photosensors.

7. A filter as claimed in claim 1, wherein each of said stripes have a selected, uniform color to reduce said undesired harmonics.

8. A filter as claimed in claim 1, wherein said stripes have rectangular sections and wherein said means for controlling conprises said stripes having selected area ratios.

* * * * *